US012573412B2

(12) United States Patent
Gautama

(10) Patent No.: US 12,573,412 B2
(45) Date of Patent: Mar. 10, 2026

(54) AUDIO PROCESSING SYSTEM AND METHOD

(71) Applicant: NXP B.V., Eindhoven (NL)

(72) Inventor: Temujin Gautama, Boutersem (BE)

(73) Assignee: NXP B.V., Eindhoven (NL)

( * ) Notice: Subject to any disclaimer, the term of this patent is extended or adjusted under 35 U.S.C. 154(b) by 113 days.

(21) Appl. No.: 18/506,201

(22) Filed: Nov. 10, 2023

(65) Prior Publication Data

US 2024/0161760 A1 May 16, 2024

(30) Foreign Application Priority Data

Nov. 14, 2022 (EP) .................................... 22207188

(51) Int. Cl.
*G06F 21/00* (2013.01)
*G10L 19/018* (2013.01)

(52) U.S. Cl.
CPC .................................. *G10L 19/018* (2013.01)

(58) Field of Classification Search
CPC ............. G10L 19/018; H04L 2209/608; G11B 20/00891
See application file for complete search history.

(56) References Cited

U.S. PATENT DOCUMENTS 9,454,789 B2 * 9/2016 Lord .................. H04N 21/6581
10,236,006 B1 3/2019 Gurijala et al.
10,546,590 B2 1/2020 Sharma et al.
2007/0076916 A1 4/2007 Rhoads et al.
2008/0273742 A1 11/2008 Lemma
2012/0214515 A1 * 8/2012 Davis .................... H04W 4/024 455/456.6
2014/0253326 A1 * 9/2014 Cho ........................ H04W 4/90 340/539.11
2016/0196630 A1 * 7/2016 Blesser ................ G10L 19/018 382/100

OTHER PUBLICATIONS

Erfani, Yousof et al.; "New Methods for Transparent and Accurate Echo Hiding by Using the Original Audio Cepstral Content"; 6th IEEE/ACIS International Conference on Computer and Information Science; ICIS Jul. 2007.
Foo, Say Wei et al.; "An Adaptive Audio Watermarking System"; Proceedings of IEEE Region 10 Intl Conference on Electrical and Electronic Technology, TENCON 2001; Aug. 19-22, 2001, Singapore; DOI: 10.1109/TENCON.2001.949647.

(Continued)

*Primary Examiner* — Yogesh Paliwal

(57) ABSTRACT

An audio system and method is described to monitor whether the audio processing performed on an audio signal is corrupted. The audio system includes module to embed a watermark into an audio signal, and a verification module to verify the presence of the watermark after the audio processing has been performed. The embedding strength of the watermark can be adjusted on the basis of whether the presence of the watermark is detected. The embedding strength for the watermark may be adjusted such that it is as low as possible while still allowing detection, thus keeping the audio quality as high as possible.

20 Claims, 5 Drawing Sheets

(56) References Cited

OTHER PUBLICATIONS

Mitra, Sameer et al.; "Experiments With and Enhancements To Echo Hiding"; 2009 Fourth International Conference on Systems and Networks Communications; Sep. 20-25, 2009, Porto Portugal; DOI: 10.1109/ICSNC.2009.76.

Shiro, Takeshi et al.; "Energy Efficient Echo-Hiding Extraction Method Based on Fine Grain Intermittent Power Control"; 2012 IEEE Sensors Applications Symposium Proceedings; Feb. 7-9, 2012, Brescia, Italy; DOI: 10.1109/SAS.2012.6166279.

Tekeli, Kadir et al.; "A Comparison of Echo Hiding Methods"; Eurasia Proceedings of Science, Technology, Engineering and Mathematics (EPSTEM); vol. 1; Nov. 9, 2017; http://www.epstem.net/en/pub/issue/31865/365048.

* cited by examiner

100

130

140

150

AUDIO PROCESSING SYSTEM AND METHOD

CROSS-REFERENCE TO RELATED APPLICATIONS

This application claims priority under 35 U.S.C. § 119 to European patent application no. 22207188.8, filed Nov. 14, 2022, the contents of which are incorporated by reference herein.

FIELD

This disclosure relates to an audio processing system and a method of audio processing.

BACKGROUND

Some audio processing systems are used for critical user notification, such as an automotive sound system that is used for playing warning sounds. For such audio systems, it is important to monitor whether the audio signal has been corrupted in the audio chain by the audio processing. For example, for a critical warning signal used to alert a user, a corrupted audio signal can lead to safety hazards. Audio signal corruption may occur for a number of reasons including intentional attacks, software failures or hardware failures.

SUMMARY

Various aspects of the disclosure are defined in the accompanying claims. In a first aspect there is provided method of processing an audio signal comprising: receiving an audio signal; watermarking the audio signal with a watermark having an embedding strength value and outputting the watermarked audio signal; processing the watermarked audio signal, and outputting the processed audio signal; determining the presence of the watermark in the processed audio signal; and adapting the embedding strength value of the watermark, dependent on the presence or absence of the watermark in the processed audio signal.

In one or more embodiments, watermarking the audio signal may further comprise: generating the watermark by delaying the audio signal, and multiplying the delayed audio signal with the embedding strength value; and adding the watermark to the audio signal.

In one or more embodiments, determining the presence of the watermark may further comprise: determining the auto-cepstrum of a plurality of samples of the processed audio signal, the plurality of samples corresponding to a time segment having a duration greater than a delay time of the delayed audio signal; determining an echo cepstral coefficient by determining the cepstral coefficient corresponding to the delay time; determining whether the watermark is present from the value of the echo cepstral coefficient.

In one or more embodiments, determining the presence of the watermark may further comprise: determining the auto-cepstrum of a plurality of samples of the processed audio signal for a plurality of time segments; determining the echo cepstral coefficient for each time segment; determining an average value of the echo cepstral coefficients; determining whether the watermark is present from the average value of the echo cepstral coefficients.

In one or more embodiments, watermarking the audio signal may comprise: generating an ultrasound reference signal; multiplying the ultrasound reference signal with the embedding strength value resulting in a modified ultrasound reference signal; and adding the modified ultrasound reference signal to the audio signal.

In one or more embodiments, the method may further comprise: receiving the processed audio signal; determining the presence of the watermark in the processed audio signal; and, in response to the watermark not being present, generating an indication that the processed audio signal is corrupted.

In one or more embodiments, the method may further comprise: in response to the watermark not being present, increasing the embedding strength value, and in response to the watermark being present, decreasing the embedding strength value.

In one or more embodiments, the method may further comprise: in response to the watermark not being present, comparing the embedding strength value with a reference embedding strength value and generating an indication that the processed audio signal is corrupted in response to the embedding strength value exceeding the reference embedding strength value.

In one or more embodiments, the processed audio signal may comprise a plurality of audio channels and wherein verifying the presence of the watermark further comprises determining whether the watermark is present in at least one audio channel of the processed audio signal.

One or more embodiments of the method may be included in an automotive audio system.

In a second aspect, there is provided a non-transitory computer readable media comprising a computer program comprising computer executable instructions which, when executed by a computer, causes the computer to perform a method of processing an audio signal comprising: receiving an audio signal; watermarking the audio signal with a watermark having an embedding strength value and outputting the watermarked audio signal; processing the watermarked audio signal, and outputting the processed audio signal; determining the presence of the watermark in the processed audio signal; and adapting the embedding strength value of the watermark, dependent on the presence or absence of the watermark in the processed audio signal.

In a third aspect, there is provided an audio processing system comprising: an audio processing module having an audio processing module input and an audio processing module output; a watermarking module comprising: an embedding module having an embedding module input configured to receive an audio signal, an embedding module control input configured to receive an embedding strength value, and an embedding module output coupled to the audio processing module input; a verification module having a verification module input coupled to the audio processing module output and a verification module control output coupled the embedding module control input; wherein the embedding module is further configured to: receive an audio signal; watermark the audio signal with a watermark having the embedding strength value and output the watermarked audio signal; the audio processing module is further configured to process the watermarked audio signal, and output the processed audio signal; and the verification module is further configured to determine the presence of the watermark in the processed audio signal; and adapt the embedding strength value of the watermark, dependent on the presence or absence of the watermark in the processed audio signal.

In one or more embodiments, the embedding module may be further configured to generate the watermark by: delaying the audio signal, multiplying the delayed audio signal with the embedding strength value; and adding the watermark to the audio signal.

In one or more embodiments, the verification module may be further configured to: determine the auto-cepstrum of a plurality of samples of the processed audio signal, the plurality of samples corresponding to a time segment having a duration greater than a delay time of the delayed audio signal; determine an echo cepstral coefficient by determining the cepstral coefficient corresponding to the delay time; and determine whether the watermark is present from the value of the echo cepstral coefficient.

In one or more embodiments, the verification module may be further configured to: determine the auto-cepstrum of a plurality of samples of the processed audio signal for a plurality of time segments; determine the echo cepstral coefficient for each time segment; determine an average value of the echo cepstral coefficients; determine whether the watermark is present from the average value of the echo cepstral coefficients.

In one or more embodiments, the embedding module may be further configured to generate the watermark by: generating an ultrasound reference signal; multiplying the ultrasound reference signal with the embedding strength value resulting in a modified ultrasound reference signal; and adding the modified ultrasound reference signal to the audio signal.

In one or more embodiments, the verification module may further comprise a verification status output and is further configured to: generate an indication that the processed audio signal is corrupted on the verification status output in response to the watermark not being present.

In one or more embodiments, the verification module may be further configured to increase the embedding strength value in response to the watermark not being present, and to decrease the embedding strength value in response to the watermark being present.

In one or more embodiments, the verification module may be further configured to in response to the watermark not being present, compare the embedding strength value with a reference embedding strength value generate the indication that the processed audio signal is corrupted in response to the embedding strength value exceeding the reference embedding strength value.

In one or more embodiments, the processed audio signal comprises a plurality of audio channels and wherein the verification module is further configured to determine whether the watermark is present in at least one audio channel of the processed audio signal.

BRIEF DESCRIPTION OF THE DRAWINGS

In the figures and description like reference numerals refer to like features. Embodiments are now described in detail, by way of example only, illustrated by the accompanying drawings in which.

Figure 1:
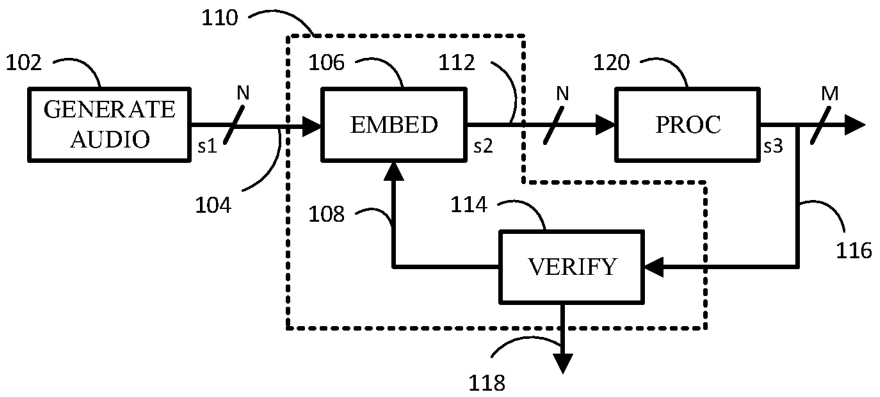
FIG. 1 shows an audio processing system according to an embodiment.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar features in modified and different embodiments.

DETAILED DESCRIPTION OF EMBODIMENTS

FIG. 1 shows an audio processing system 100 according to an embodiment. The audio processing system 100 includes an audio generator 102, an audio processing module 120 and a watermarking module 110 including an embedding module 106 and a verification module 114. The audio generator 102 may have an audio generator output 104 connected to an embedding module input of the embedding module 106. An embedding module output 112 may be connected to an audio processing input of the audio processing module 120. An audio processing module output 116 may be connected to the output of the audio processing system 100 and may also be connected to a verification module input of the verification module 114. The verification module 114 may have a verification module status output 118 and a verification module control output 108. The verification module control output 108 may be connected to an embedding module control input of the embedding module 106.

In operation, the audio generator 102 may provide an audio signal s1 having N audio channels. In other examples the audio signal may be received from another source, for example read from memory in which case the audio generator 102 may be omitted. A watermark may be embedded into the audio signal by the embedding module 106 with a certain embedding strength. The watermarked audio signal s2 may then be provided to the audio processing module 120. The output of the audio processing module 120 may be an M-channel processed audio signal, s3, which is also provided as an input to the verification module 114. The verification module 114 may analyse the processed audio signal, s3, to determine whether the watermark is still present after processing and output a signal which indicates the presence or absence of the watermark on the verification module status output 118. In some examples the verification module status output 118 may be omitted. A control signal may be sent from the verification module control output 108 to the embedding module 106 to change the amplitude or embedding strength of the watermark in the audio signal by changing the embedding strength value which may be a gain value. The audio processing module 120 may perform a number of audio processing operations on audio signal s2 such as (adaptive) filtering, channel up-mixing and dynamic range compression, resulting in an M-channel processed audio signal s3. The audio processing system 100 may be implemented in hardware, software or a combination of hardware and software.

The audio processing system 100 uses audio watermarking, which is a technique that is traditionally used in the context of copyright protection, e.g., to prevent or detect illegal retransmissions of digital media content. Information is imperceptibly embedded into the audio signal and can be retrieved when necessary. The audio watermark should be inaudible and robust to common signal processing operations, such as filtering, resampling, dynamic range compression, etc.

The audio processing system 100 monitors whether the audio processing is intact, by adding a watermark before the audio processing module and by validating the presence of the watermark after audio processing. The embedding strength for the watermark may be adjusted such that it is as low as possible while still allowing detection, thus keeping the audio quality as high as possible.

The audio processing system 100 may detect whether the output of the audio processing is corrupted, for example because a filter has become unstable, because the program or other memory has been overwritten, or because the audio processing code has reached an unexpected state. The approach to detecting this is to verify whether the watermark that has been embedded before the audio processing, is still present after the audio processing in at least one of the M audio channels of processed audio signal s3.

The objective of digital watermarking is to embed proprietary data into a digital object in such a way that it is imperceptible and that it can be extracted when required (e.g., to verify the ownership of the digital object). In the context of audio, data may be embedded into a digital audio file without introducing audible distortions. There exist different approaches to audio watermarking, such as spread spectrum, phase coding, masking, adding an ultrasound reference signal and echo-hiding. Echo-hiding is an approach that uses simple encoding and decoding schemes, and that is robust to audio manipulations such as filtering, resampling and dynamic range compression.

Echo-hiding adds a small echo of the original audio in the embedding phase. In single echo-hiding, an echo is positioned at a delay d0 corresponding to a delay time with amplitude a. For hiding a binary message, two delay-amplitude pairs can be used, (d0, $\alpha$) and (d1, $\alpha$) to encode "0" and "1". The embedding strength can be modified by setting a. Detection can be performed by computing the auto-cepstrum of the signal and observing the coefficients that correspond to d0 and d1. The embedded bit can be extracted by tracking which of the two coefficients is higher. By changing the watermark over time, a binary message can be encoded. Other approaches to echo-hiding include bipolar, backward-forward, bipolar backward-forward and time-spread echo-hiding.

In one example, the single echo-hiding approach may be used, but in other examples, other watermarking approaches can be used as described above and also by for example adding an ultrasound reference signal. For single echo-hiding, because the echo is present across the complete frequency spectrum and on each channel of the watermarked audio signal s2, the watermarking is robust to many processing types, such as filtering, up-mixing and dynamic range compression. This makes echo-hiding a very suitable watermark for the proposed system. Other watermarking approaches may also work, if they are robust to the audio processing.

Figure 2:
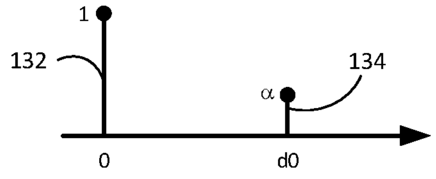
FIG. 2 illustrates an echo kernel for single echo-hiding.

In one example, the embed module 106 may add, a delayed version at lag d0 of the audio signal s1 to the original audio signal s1 according to equation (1):

$$s2[k]=s1[k]+\alpha s1[k-d0], \tag{1}$$

where $\alpha$ is the embedding strength, which is a parameter that controls the trade-off between detection robustness (a high value of $\alpha$ will yield a signal in which the watermark is easier to detect) and audio distortion (a high value of a leads to audible comb filtering effects). Note that this is equivalent to filtering the audio signal s1 with an echo kernel 130 as shown in FIG. 2 having a value of 1 at x=0 shown by line 132 and value of $\alpha$ at do shown by line 134. This echo kernel is the impulse response of a comb filter. The embedding module 106 may repeat the watermarking for each of the N channels of the audio signal s1, with the same embedding parameters.

For echo hiding, the verification module 114 may analyse the signal s3 to verify the presence of the expected watermark. In some examples, this may be done for a single channel by performing an auto-cepstrum analysis for a given time frame n of, e.g., N=1024 samples (N>d0):

$$c_n[i]=\mathrm{ifft}(\log(\mathrm{abs}(\mathit{fft}(s_n[i])))) \tag{2}$$

Figure 3:
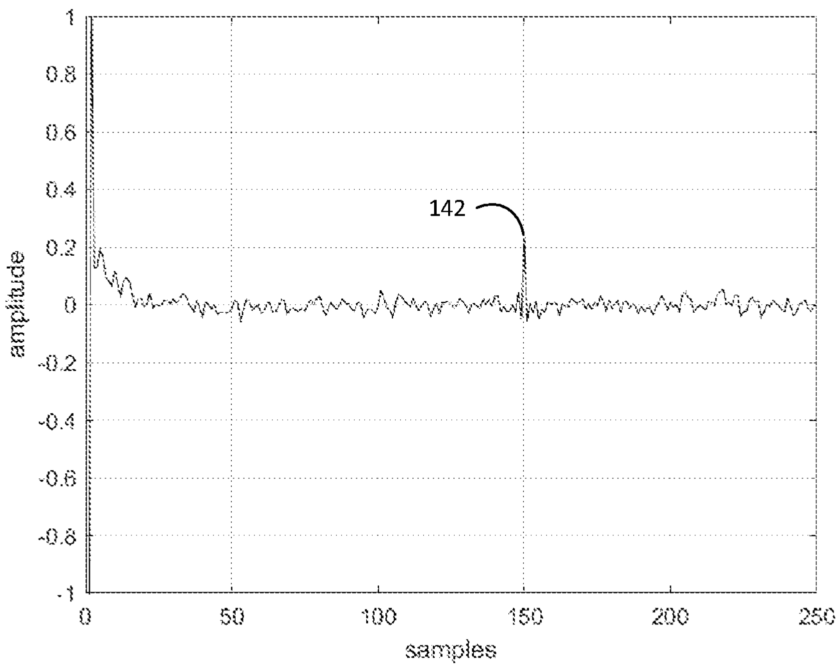
FIG. 3 shows an example of a cepstrum for echo detection.

The result $c_n$[i] is also referred to as the autocorrelation of the cepstrum or the auto-cepstrum. The d0-th cepstral coefficient which herein may be referred to as the echo cepstral coefficient should be near zero if the echo is absent, and it should be non-zero when the echo is present in the audio signal. FIG. 3 shows an example of an auto-cepstrum 140 for an N=1024 segment of music with embedded strength value $\alpha$=0.5 and delay d0=150. The delay is shown on the x-axis ranging between 0 and 250 and the normalized amplitude ranging between −1 and +1 is shown on the y-axis. A clear peak 142 can be observed at delay sample 150, which corresponds to the value of d0. However, a value of $\alpha$=0.5 may result in audible comb filtering effects to the audio (not shown), which may not be acceptable, in which case the embedded strength value may be reduced.

Figure 4:
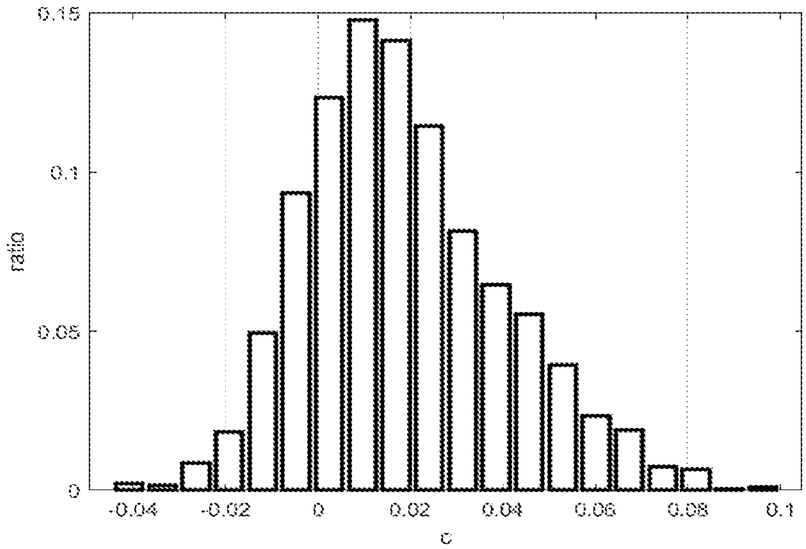
FIG. 4 histogram of a cepstrum coefficient for embedding strength.

In some examples, the presence detection may be improved by taking an average of the cepstrum coefficient for a number of time segments. FIG. 4 shows the histogram 150 of the $d_0$-th cepstrum coefficient on the x-axis computed for 2000 consecutive, 50%-overlapping time segments of a music signal for $\alpha$=0.1. versus the probability of the occurrence of each value of the $d_0$-th cepstrum coefficient on the y-axis. The average value is 0.018, but the histogram shows that a considerable ratio of the segments have a value lower than 0 (approximately 20%). Single cepstrum values for this embedding strength are therefore not reliable to conclude whether the watermark is present for smaller embedding strengths. To be able to detect the presence of the watermark, even for small embedding strengths, the analysis is performed over a number of past L time frames, which can be overlapping (e.g., by 50%). For each segment, a coefficient at sample $d_0$ is computed, yielding a set of L coefficients. A (statistical) test can now be used to determine whether the sample average is zero (which would indicate that the echo is absent). This can be achieved, e.g., by (two-sided) testing the null hypothesis with a t-test at a certain significance level.

A rejection of the null hypothesis indicates that the watermark is present. Other, more heuristic methods can also be used, e.g., testing whether the absolute value of the average is higher than a number of times the expected standard deviation of the mean. The test should be repeated for each channel of $s_3$, and if at least one test indicates the presence of the watermark, the audio chain is judged intact.

Although the echo-hiding watermark is expected to be robust to audio processing, the embedding strength required for robust detection may depend on the type of audio processing, and on the audio signal $s_1$. The embedding strength can therefore be adapted over time, such that the embedding strength remains small when possible:

if the null hypothesis is rejected at frame n, decrease $\alpha$, and increase otherwise if $\alpha>\alpha_1$, flag that audio chain is corrupted if $\alpha<\alpha_2$, set $\alpha=\alpha_2$ (keep a minimal embedding strength)

Where $\alpha_1$ may be a reference embedding strength value and $\alpha_2$ may be a minimum embedding strength value. The cepstrum coefficient may be non-zero in the absence of the watermark, e.g., due to a periodicity in the frequency spectrum of the audio signal or because of certain reverberations present in the audio signal. In some examples, the watermark may alternate between two different delays, or between the presence and absence of a single delay, with a known time period. This could then be taken into account into the detection mechanism. In these examples, detection by the verification module 114 would not test for an average of zero, but for the presence of the expected behaviour. Instead of testing for non-zero of each segment, some segments should be zero and other segments should be non-zero.

Figure 5:
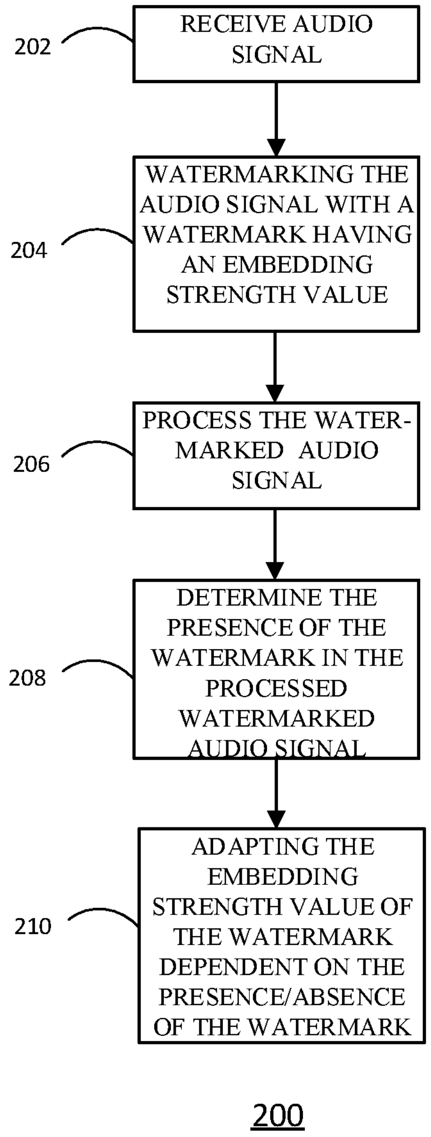
FIG. 5 shows a method of audio processing according to an embodiment.

FIG. 5 shows a method of audio processing 200 according to an embodiment. The method 200 may be implemented for example by audio processing system 100 or some other suitable apparatus. In step 202, an audio signal may be received. In step 204, the received audio signal may be watermarked by a watermark having an embedding strength value. The watermark may be generated for example by spread spectrum, phase coding, masking, echo-hiding or by adding an ultrasound (non-audible) signal to the audio signal. In step 206, the watermarked audio signal may be processed by an audio processor which may for example include applying one or more of resampling, (adaptive) filtering, channel up-mixing and dynamic range compression to the watermarked audio signal. In step 208, the processed audio signal resulting from step 206 may be verified to determine the presence of the watermark. In step 210, the embedding strength value of the watermark applied to subsequent time segments of the received audio signal may be adapted depending on whether the watermark is determined to be present or absent in the processed audio signal. For example, the embedding strength value may be increased if the watermark is not present or decreased if the watermark is present.

Figure 6:
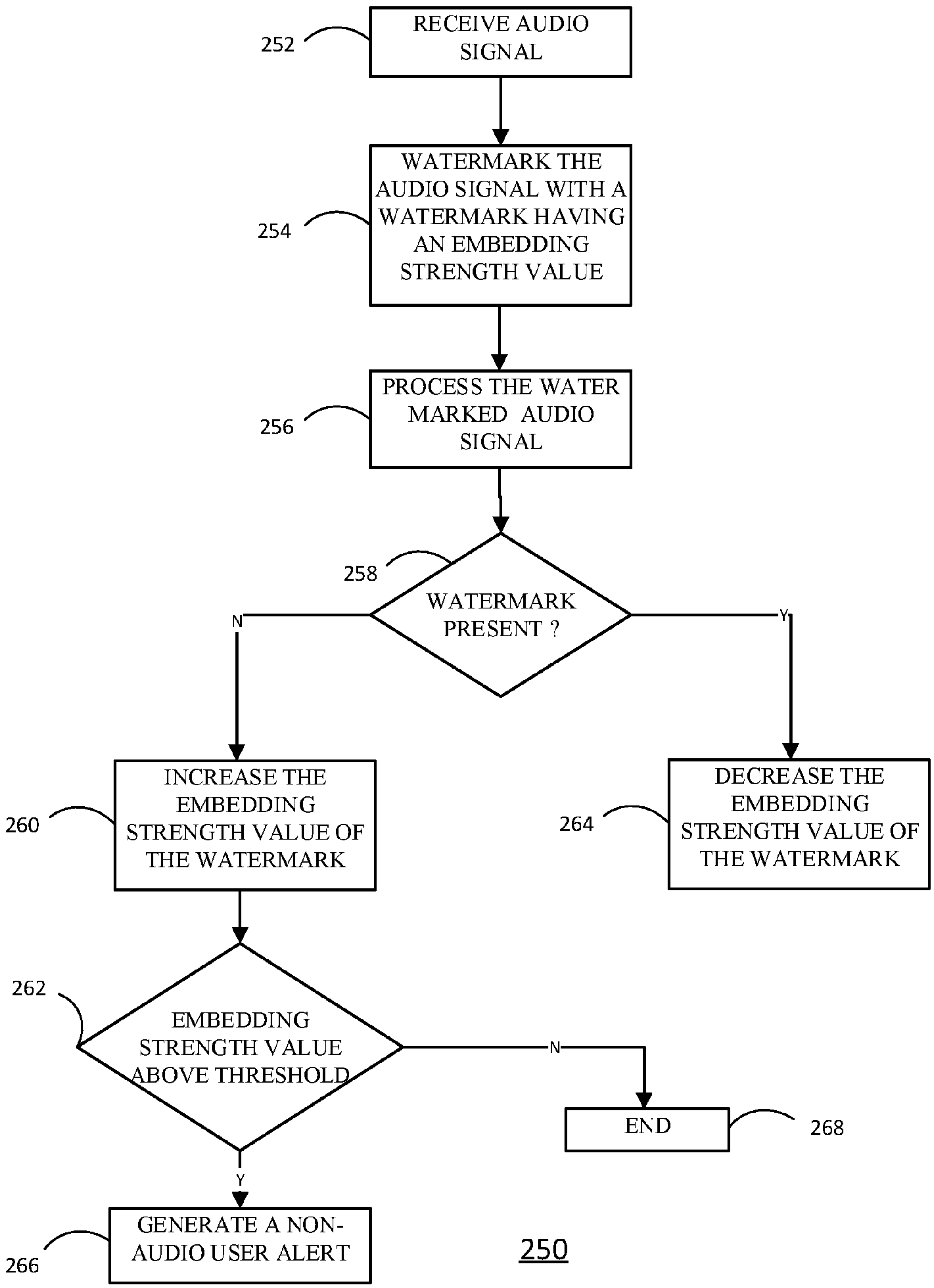
FIG. 6 illustrates a method of audio processing according to an embodiment.

FIG. 6 shows a method of audio processing 250 according to an embodiment. The method 250 may be implemented for example by audio processing system 100 or some other suitable apparatus. In step 252, an audio signal may be received. In step 254, the received audio signal may be watermarked by a watermark having an embedding strength value. The watermark may be generated for example by spread spectrum, phase coding, masking, echo-hiding or by adding an ultrasound (non-audible) signal to the audio signal. In step 256, the watermarked audio signal may be processed by an audio processor which may for example include applying one or more of (adaptive) filtering, channel up-mixing and dynamic range compression to the watermarked audio signal. In step 258, the processed audio signal resulting from step 256 may be verified. If the watermark is determined not to be present in the processed audio signal, the method proceeds to step 260, and the embedding strength value of the watermark may be increased. In step 262, the method may check if the embedding strength exceeds a certain threshold value. If the embedding strength exceeds the threshold value, in step 266 a non-audio user alert may be generated to indicate that the audio signal is faulty and/or to alert the user to a possible fault condition or other user alert. Otherwise the method may end in step 268. For example for a system included in an automotive environment, to signal for example, that the audio warning subsystem is inoperative and that an audible warning that a door is not closed or seatbelt is not fastened, low fuel etc., cannot be produced via audio cues. Returning to step 258, if the watermark is determined to be present in the processed audio signal, the embedding strength value of the watermark applied to subsequent time segments of the received audio signal may be decreased in step 264, which may minimize any possible impact of the watermark on audio quality.

Figure 7:
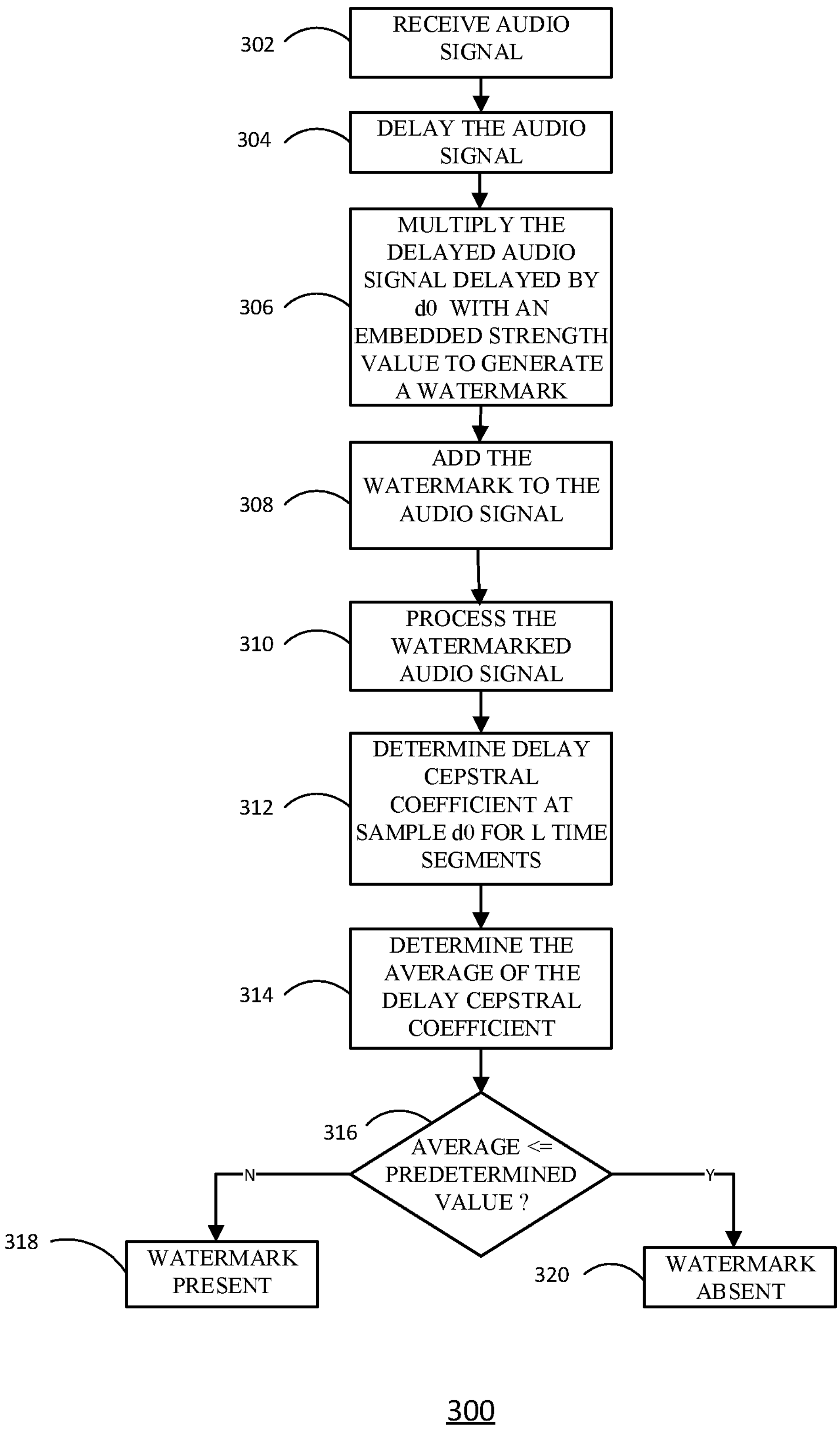
FIG. 7 shows a method of audio processing according to an embodiment.

FIG. 7 shows a method of audio processing 300 according to an embodiment. The method 300 may be implemented for example by audio processing system 100 or some other suitable apparatus. In step 302, an audio signal may be received. In step 304, the received audio signal may be watermarked by a watermark having an embedding strength value by first delaying the audio signal in step 304 and then in step 306 multiplying the delayed audio signal delayed by an amount d0 with an embedded strength value to generate a watermark which is added to the audio signal in step 308. In step 310, the watermarked audio signal may be processed which may for example include applying one or more of (adaptive) filtering, channel up-mixing and dynamic range compression to the watermarked audio signal. The processed audio signal may be verified by firstly in step 312 by determining the cepstral coefficient corresponding to delay d0, secondly in step 314 by determining the average of the delay cepstral coefficient for a number (L) time segments and thirdly in step 316 comparing the average of the delay cepstral coefficient to a predetermined value. If the average value of the delay cepstral coefficient is less than or equal to a predetermined value, the watermark is determined to be absent in the processed audio signal in step 320. Otherwise in step 318 the watermark is determined to be present. Following the determination of the watermark presence or absence, further steps described in other examples may follow, for example increasing or reducing the embedding strength value, generating a status to a user, or generating a non-audio alert.

Embodiments of the audio processing system and method described the use of audio watermarking which is typically used to retrieve hidden information, and is embedded in such a way that the watermark is likely to be robust to audio processing. In the proposed invention, the objective is to monitor exactly this audio processing, which is encapsulated in an embedding/detection system, possibly in a closed-loop: if the watermark is not detected, the embedding strength can be increased. Embodiments may be included as part of an audio chain, where the audio processing needs to be monitored from a functional safety perspective. Examples may include but are not limited to an audio chain for audio alert signal generation and playback in industrial control systems and/or included in an automotive audio system automotive applications.

An audio system and method is described to monitor whether the audio processing performed on an audio signal is corrupted. The audio system includes a module to embed a watermark into an audio signal, and a verification module to verify the presence of the watermark after the audio processing has been performed. The embedding strength of the watermark can be adjusted on the basis of whether the presence of the watermark is detected. The embedding strength for the watermark may be adjusted such that it is as low as possible while still allowing detection, thus keeping the audio quality as high as possible.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable sub combination.

The applicant hereby gives notice that new claims may be formulated to such features and/or combinations of such features during the prosecution of the present application or of any further application derived therefrom.

For the sake of completeness it is also stated that the term “comprising” does not exclude other elements or steps, the term “a” or “an” does not exclude a plurality, a single processor or other unit may fulfil the functions of several means recited in the claims and reference signs in the claims shall not be construed as limiting the scope of the claims.

The invention claimed is:

1. A method of processing an audio signal comprising:
- receiving an audio signal;
- watermarking, by an embedding module, the audio signal with a watermark having an embedding strength value to produce a watermarked audio signal and outputting the watermarked audio signal;
- processing, by an audio processor, the watermarked audio signal, and outputting a processed watermarked audio signal;
- determining a presence of the watermark in the processed watermarked audio signal containing the audio signal and the watermark;
- adapting the embedding strength value of the watermark, by a verification module, to produce an adapted embedding strength value, dependent on a presence or an absence of the watermark in the processed watermarked audio signal; and
- watermarking, by the embedding module, the processed watermarked audio signal containing the audio signal and the watermark with an enhanced watermark having an adapted embedding strength value, and outputting the watermarked processed audio signal having the enhanced watermark.

2. The method of claim 1, wherein watermarking the audio signal further comprises:
- generating the watermark by delaying the audio signal to produce a delayed audio signal, and multiplying the delayed audio signal with the embedding strength value; and
- adding the watermark to the audio signal.

3. The method of claim 2, wherein determining the presence of the watermark further comprises:
- determining an auto-cepstrum of a plurality of samples of the processed watermarked audio signal, the plurality of samples corresponding to a time segment having a duration greater than a delay time of the delayed audio signal;
- determining an echo cepstral coefficient by determining a cepstral coefficient corresponding to the delay time; and
- determining whether the watermark is present from a value of the echo cepstral coefficient.

4. The method of claim 3, wherein determining the presence of the watermark further comprises:
- determining the auto-cepstrum of a plurality of samples of the processed audio signal for a plurality of time segments;
- determining the echo cepstral coefficient for each time segment;
- determining an average value of the echo cepstral coefficients; and
- determining whether the watermark is present from the average value of the echo cepstral coefficients.

5. The method of claim 1 wherein watermarking the audio signal comprises:
- generating an ultrasound reference signal;
- multiplying the ultrasound reference signal with the embedding strength value resulting in a modified ultrasound reference signal; and
- adding the modified ultrasound reference signal to the audio signal.

6. The method of claim 1 further comprising:
- receiving the processed watermarked audio signal; and
- determining the presence of the watermark in the processed watermarked audio signal; and, in response to the watermark not being present, generating an indication that the processed watermarked audio signal is corrupted.

7. The method of claim 1 further comprising: in response to the watermark not being present, increasing the embedding strength value, and in response to the watermark being present, decreasing the embedding strength value.

8. The method of claim 1 further comprising: in response to the watermark not being present, comparing the embedding strength value with a reference embedding strength value and generating an indication that the processed watermarked audio signal is corrupted in response to the embedding strength value exceeding the reference embedding strength value.

9. The method of claim 1, wherein the processed watermarked audio signal comprises a plurality of audio channels and wherein verifying the presence of the watermark further comprises determining whether the watermark is present in at least one audio channel of the processed watermarked audio signal.

10. A method of audio alert signal generation for an automotive audio system, comprising the method of claim 1.

11. A non-transitory computer readable media comprising a computer program comprising computer executable instructions which, when executed by a computer, causes the computer to perform a method of receiving an audio signal;

watermarking, by an embedding module, the audio signal with a watermark, to produce a watermarked audio signal, having an embedding strength value and outputting the watermarked audio signal;

processing, by an audio processor, the watermarked audio signal, and outputting a processed watermarked audio signal;

determining a presence of the watermark in the processed watermarked audio signal containing the audio signal and the watermark;

adapting the embedding strength value of the watermark, by a verification module, to produce an adapted embedding strength value, dependent on a presence or an absence of the watermark in the processed watermarked audio signal; and watermarking, by the embedding module, the processed watermarked audio signal containing the audio signal and the watermark with an enhanced watermark having an adapted embedding strength value, and outputting the watermarked processed audio signal having the enhanced watermark.

12. An audio processing system comprising:

an audio processing module having an audio processing module input and an audio processing module output;

a watermarking module comprising:

an embedding module having an embedding module input configured to receive an audio signal, an embedding module control input configured to receive an embedding strength value, and an embedding module output coupled to the audio processing module input;

a verification module having a verification module input coupled to the audio processing module output and a verification module control output coupled the embedding module control input; wherein the embedding module is further configured to:

receive an audio signal;

watermark the audio signal with a watermark having the embedding strength value to produce a watermarked audio signal, and output the watermarked audio signal;

the audio processing module is further configured to process the watermarked audio signal containing the audio signal and the watermark to produce a processed watermarked audio signal, and output the processed watermarked audio signal;

the verification module is further configured to determine a presence of the watermark in the processed watermarked audio signal containing the audio signal and the watermark; and adapt the embedding strength value of the watermark embedded by the embedding module in response to the verification module control output, dependent on the presence or an absence of the watermark in the processed watermarked audio signal; and the embedding module is further configured to embed the watermarked processed audio signal with an enhanced watermark.

13. The audio processing system of claim 12, wherein the embedding module is further configured to generate the watermark by:

delaying the audio signal to produce a delated audio signal, multiplying the delayed audio signal with the embedding strength value; and adding the watermark to the audio signal.

14. The audio processing system of claim 13, wherein the verification module is further configured to:

determine an auto-cepstrum of a plurality of samples of the processed watermarked audio signal for a plurality of time segments;

determine the echo cepstral coefficient for each time segment;

determine an average value of the echo cepstral coefficients; and;

determine whether the watermark is present from the average value of the echo cepstral coefficients.

15. The audio processing system of claim 12, wherein the verification module is further configured to:

determine an auto-cepstrum of a plurality of samples of the processed watermarked audio signal, the plurality of samples corresponding to a time segment having a duration greater than a delay time of a delayed audio signal;

determine an echo cepstral coefficient by determining a cepstral coefficient corresponding to the delay time; and determine whether the watermark is present from a value of the echo cepstral coefficient.

16. The audio processing system of claim 12, wherein the embedding module is further configured to generate the watermark by:

generating an ultrasound reference signal;

multiplying the ultrasound reference signal with the embedding strength value resulting in a modified ultrasound reference signal; and adding the modified ultrasound reference signal to the audio signal.

17. The audio processing system of claim 12, wherein the verification module further comprises a verification status output and is further configured to:

generate an indication that the processed watermarked audio signal is corrupted on the verification status output in response to the watermark not being present.

18. The audio processing system of claim 17, wherein the verification module is further configured to in response to the watermark not being present, compare the embedding strength value with a reference embedding strength value generate the indication that the processed watermarked audio signal is corrupted in response to the embedding strength value exceeding the reference embedding strength value.

19. The audio processing system of claim 12, wherein the verification module is further configured to increase the embedding strength value in response to the watermark not being present, and to decrease the embedding strength value in response to the watermark being present.

20. The audio processing system of claim 12, wherein the processed watermarked audio signal comprises a plurality of audio channels and wherein the verification module is further configured to determine whether the watermark is present in at least one audio channel of the processed watermarked audio signal.

* * * * *